United States Patent [19]

Chang

[11] 4,008,769
[45] Feb. 22, 1977

[54] OIL RECOVERY BY MICROEMULSION INJECTION

[75] Inventor: Harry L. Chang, Dallas, Tex.
[73] Assignee: Mobil Oil Corporation, New York, N.Y.
[22] Filed: Apr. 30, 1975
[21] Appl. No.: 573,236
[52] U.S. Cl. .............................. 166/274; 252/8.55 D
[51] Int. Cl.² ........................................ E21B 43/22
[58] Field of Search .......... 166/267, 270, 274, 275, 166/300, 273; 252/8.55 D

[56] References Cited

UNITED STATES PATENTS

| | | | |
|---|---|---|---|
| 3,298,436 | 1/1967 | McCardell | 166/270 |
| 3,302,711 | 2/1967 | Dilgren | 166/270 |
| 3,330,344 | 7/1967 | Reisberg | 166/275 |
| 3,330,347 | 7/1967 | Brown et al. | 166/270 |
| 3,506,070 | 4/1970 | Jones | 166/274 |
| 3,536,136 | 10/1970 | Jones | 166/275 |
| 3,874,453 | 4/1975 | Friedman | 166/274 |
| 3,929,190 | 12/1975 | Chang et al. | 166/273 |

*Primary Examiner*—Ernest R. Purser
*Attorney, Agent, or Firm*—C. A. Huggett; William D. Jackson

[57] ABSTRACT

A process for the recovery of oil from a subterranean oil reservoir involving the injection of a microemulsion comprising neutralized organic acids extracted from a petroleum oil, oil, and a co-surfactant having mutual solubility for oil and water. The microemulsion may be injected in two portions with the terminal portion having lower concentrations of oil and co-surfactant than the initial portion. The neutralized organic acids employed in the microemulsion may be produced by the alkaline extraction of a petroleum oil. The microemulsion may also contain an alkyl aryl sulfonate, an alkaline agent, and a monovalent salt.

15 Claims, 1 Drawing Figure

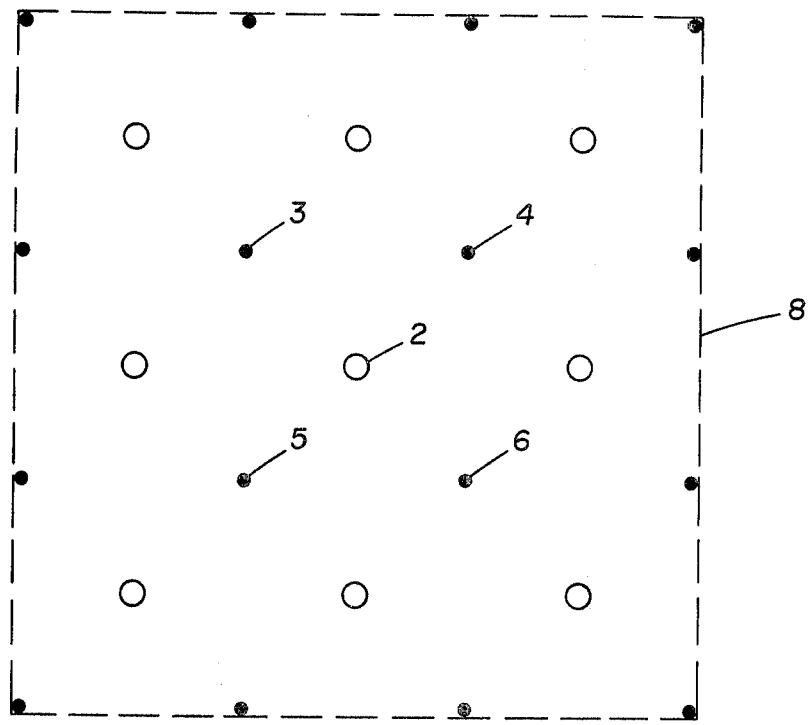

OIL RECOVERY BY MICROEMULSION INJECTION

BACKGROUND OF THE INVENTION

This invention relates to the recovery of oil from subterranean oil reservoirs and more particularly to improved waterflooding operations involving the injection of a water-external microemulsion comprised of an aqueous medium containing neutralized organic acids extracted from a petroleum oil.

In the recovery of oil from oil-bearing reservoirs, it is usually possible to recover only minor portions of the original oil in place by the so-called primary recovery methods which utilize only the natural forces present in the reservoir. Thus a variety of supplemental recovery techniques has been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the injected water in order to lower the oil-water interfacial tension and/or to alter the wettability characteristics of the reservoir rock. Also, it has been proposed to add thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. To data one of the more promising low tension waterflooding techniques involves the injection of aqueous solutions of petroleum sulfonates within a designated equivalent weight range and under controlled conditions of salinity. For example, in a paper by W. R. Foster entitled "A Low-Tension Waterflooding Process", JOURNAL OF PETROLEUM TECHNOLOGY, Vol. 25, Feb. 1973, pp. 205–210, there is disclosed a procedure which involves the sequential injection of a protective slug, a surfactant slug, and a mobility control slug. The protective slug is an aqueous solution of sodium chloride which is injected in order to displace the reservoir water ahead of the subsequently injected surfactant slug. This slug is substantially free of divalent ions which would tend to precipitate the surfactant slug. It, as well as the surfactant slug, may contain inorganic sacrificial agents such as sodium carbonate and/or sodium tripolyphosphate which function to reduce adsorption of the surfactant.

The surfactant slug comprises an aqueous solution of petroleum sulfonates having an average molecular weight within the range of 350–500 and contains sodium chloride in a concentration, typically about 1.0 to 2.0 weight percent, which will promote the desired low interfacial tension between the injected water and the reservoir oil. The subsequently injected thickened water slug contains a viscosifier such as a water-soluble biopolymer in a graded concentration in order to provide an initial viscosity greater than viscosity of the reservoir oil and a terminal viscosity near that of water. Thereafter a driving fluid such as produced field brine is injected in order to carry the process to conclusion.

Another waterflooding procedure in which the displacement of oil by the injected water is enhanced by a low oil-water interfacial tension is disclosed in U.S. Pat. No. 3,929,190 Harry L. Chang, Evin L. Cook, and Ralph F. Burdyn. In this process, a petroleum oil is contacted with an aqueous solution of an alkaline agent in order to extract neutralized organic acids from the oil into the aqueous medium. The resulting aqueous solution of neutralized organic acids, which may contain some oil in the form of a fine emulsion, is then injected into the reservoir to displace the oil therein.

Another approach to the enhanced recovery of oil involves the injection of a water-oil-surfactant system referred to generally as a "microemulsion" system. This system is defined by Healy et al., "Physicochemical Aspects of Microemulsion Flooding", SPE Paper 4583, 48th Annual Fall Meeting of the SPE of AIME, Las Vegas, Sept. 30–Oct. 3, 1973, as a "stable, translucent micellar-solution of oil, water that may contain electrolytes, and one or more amphiphilic compounds (i.e., surfactants, alcohols, etc.)".

A somewhat different approach to defining these systems is taken in U.S. Pat. No. 3,506,071 to Jones. The patentee here refers to the term "micellar dispersion" as including "micellar solutions", "water-external 'micro-emulsion'", and "'transparent' emulsions". Jones suggests that the strongest differentiation between micellar dispersions and emulsions is the thermodynamic stability of the former.

Regardless of the terminology used, such microemulsions generally contain, in addition to water and oil, surfactants such as petroleum sulfonates, co-surfactants such as alcohols, and electrolytes. For example, the aforementioned patent to Jones refers to the volume amounts of these various constituents as being about 1 percent to about 50 percent of hydrocarbon, from about 40 percent to about 95 percent aqueous medium, at least about 4 percent sulfonate, from about 0.01 percent to about 5 percent of semipolar compound (co-surfactant), and up to about 4 percent by weight of electrolyte. Electrolytes which are said to be useful in Jones include inorganic bases such as sodium hydroxide, salts such as sodium chloride, and inorganic acids such as hydrochloric acid. The patentee notes that acids and neutral salts are preferred when the system contains hydrophilic sulfonates and where high reservoir temperatures are involved, whereas electrolytes such as sodium hydroxide which yield a higher pH are preferred with the more oleophilic sulfonates.

SUMMARY OF THE INVENTION

In accordance with the present invention, there is provided a new and improved waterflooding process involving the injection of a water-external microemulsion. The microemulsion injected into the reservoir comprises an aqueous medium containing neutralized organic acids extracted from a petroleum oil, oil in an amount within the range of 0.5–50 percent by volume and a suitable amount of a co-surfactant having mutual solubility for oil and water. Subsequent to injection of the microemulsion, an aqueous flooding medium is injected in order to displace reservoir oil to a production system penetrating the reservoir from which the oil is recovered.

In a preferred embodiment of the invention, the microemulsion is injected in an amount within the range of 0.05–0.4 pore volume. The terminal portion of the injected microemulsion slug exhibits a lower concentration of oil and of co-surfactant that the initial portion of this slug.

In yet a further embodiment of the invention, the neutralized organic acids employed in the microemulsion are produced by alkaline extraction of an acidic petroleum oil. The petroleum oil, which may be a crude oil or fraction thereof, is contacted with an aqueous solution of an alkaline agent in order to neutralize the organic acids in the oil and extract them into the aqueous medium. A mixture of a portion of the oil and the resulting aqueous solution of neutralized acids is then separated from the remainder of the oil. A co-surfactant is then added to this mixture in an amount sufficient to form the microemulsion which is injected into the reservoir via the injection system.

BRIEF DESCRIPTION OF THE DRAWING

The drawing is an illustration exhibiting one form of a well pattern which may be employed in carrying out the present invention.

DESCRIPTION OF SPECIFIC EMBODIMENTS

An essential feature of the present invention resides in the use of a microemulsion containing neutralized organic acids extracted from a petroleum oil. The petroleum oil from which the acids are extracted may be a distillate fraction such as may be produced during conventional petroleum refining operations or it may be a petroleum crude oil which is substantially unrefined except for the preliminary field processing steps which are usually carried out to separate gas, water, and sediments from the crude oil. Any suitable technique may be employed to obtain the neutralized organic acids. They may be extracted from the petroleum oil first in their acid form and then neutralized or they may be extracted from the oil in the neutralized from.

A suitable technique for obtaining the neutralized acids is an alkaline extraction process such as disclosed in U.S. Pat. No. 3,929,190 by Harry L. Chang, Evin L. Cook, and Ralph F. Burdyn. In this technique, the petroleum oil is contacted with an aqueous solution of an alkaline agent in order to neutralize the predominantly oil-soluble acids to their corresponding water-soluble neutralized form. Preferably, the alkaline agent employed in the extraction process is sodium hydroxide which is present in the aqueous medium in an amount to provide a 0.05 N – 1.0 N solution. However, other alkali metal or ammonium hydroxides or carbonates may be employed in the extraction process. The water employed in making the alkaline solution should be relatively fresh, normally containing less than 500 ppm dissolved salts since a high salt content will tend to retard the extraction process. The crude oil or petroleum fraction used as feedstock for the extraction process normally should have an acid number of at least 0.2 in order to provide sufficient acids for the extraction process. The acid number is defined as the milligrams of potassium hydroxide required to neutralize the acids in one gram of oil in a nonaqueous-type titration.

The output from the extraction zone is separated into two portions, one comprising the oil from which the organic acids have been extracted and also containing a minor amount of residual alkaline agent, and the other a mixture of the aqueous solution of neutralized organic acids and oil. The total amount of oil in this mixture normally will be within the range of 0.5–50 percent by volume. A portion of the oil present in this mixture may be in the form of a relatively fine oil and water macroemulsion containing about 2–20 percent oil in the dispersed phase in droplet sizes ranging from about 0.1–10.0 macrons. Additional oil normally will be present in a separate phase.

The aqueous medium in this mixture may contain the neutralized organic acids in a concentration as low as 0.5 percent by weight (based upon the aqueous medium) to as high as 35 percent by weight. Normally however the neutralized acid concentration will fall within the range of about 2–30 weight percent. The concentration of neutralized organic acids in the subsequently formed microemulsion preferably will be within the range of 1–10 weight percent based upon the amount of aqueous medium in the microemulsion. Thus, in some instances it may be necessary to actually increase the neutralized organic content prior to formation of the microemulsion by concentrating the aqueous solution such as through evaporation. However, in most instances it will be necessary to dilute the solution with additional water in order to arrive at the desired concentration of neutralized organic acids. The preferred portion of oil in the microemulsion will be within the range of 2–20 volume percent. Thus, it may be necessary to additional oil also. For a more detailed description of the extraction process outlined above, reference is made to the aforementioned U.S. Pat. No. 3,929,190 to Chang et al.

As noted hereinafter, it is preferred to adjust the monovalent salt salinity and the alkalinity of the microemulsion within prescribed ranges. This preferably is accomplished prior to the ultimate formation of the microemulsion involving addition of the co-surfactant and thus can be accomplished during the dilution step if it is necessary to add more oil and/or water to the preliminary oil-water mixture. In addition, if an alkyl aryl sulfonate is employed as described hereinafter, this can be added at this time also.

After the inclusion of such of the above-identified components as may be employed, the co-surfactant is added in an amount sufficient to form a microemulsion. Formation of the microemulsion will be evident by the change of the oil-water mixture from an opaque mixture to a translucent and in some cases transparent mixture. The co-surfactant may be any suitable amphiphilic compound having a polar group which is water soluble and a nonpolar group which is oil soluble such that the compound exhibits mutual solubility for oil and water. Preferred co-surfactants employed in carrying out the present invention are aliphatic or alkyl aryl alcohols having molecular weights within the range of 40–300 and more desirably within the range of 40–220. Thus suitable co-surfactants include pentanol, isopropanol, hexanol, and alkyl aryl alcohols such as nonylphenol. The co-surfactant preferably is present in the amount within the range of 0.5–10 percent by volume of the microemulsion.

As noted previously, an alkaline agent may be present in the microemulsion. The alkaline agent, if present, will function to effect some neutralization of organic acids contained within the reservoir oil to the corresponding surface-active salts. While the alkalinity of the microemulsion may be specific with regard to the particular reservoir involved, the preferred pH normally will be within the range of 10–12. The alkaline agent employed preferably will be an alkali metal or ammonium hydroxide although in some cases alkali metal carbonates may be employed. Usually it will be desirable to use sodium hydroxide as the alkaline agent since it is a strong base and is economical and readily available.

Preferably the microemulsion will contain a monovalent salt within the range of 0.5–2.5 weight percent based upon the aqueous medium in the microemulsion. The monovalent salt salinity requirements normally will be accomplished through the use of sodium chloride since this salt is inexpensive and readily available. However, salinity control can be accomplished by means of other monovalent salts particularly the alkali metal halides such as potassium chloride.

In many cases it will be desirable to employ an alkyl aryl sulfonate as an adjunct to the monovalent metal soaps derived from the petroleum acids. Preferably the alkyl aryl sulfonate will exhibit an average molecular weight within the range of 200–600 and will be employed in an amount within the range of 0.5–10 percent by weight based upon the aqueous medium in the microemulsion. Normally the alkyl aryl sulfonate will take the form of a petroleum sulfonate although the so-called synthetic sulfonates such as those derived from sulfonation of products such as keryl benzenes may be employed. The sulfonate molecular weight range set forth herein is calculated as the equivalent weight for the sodium form assuming 100 percent monosulfonation.

In a preferred embodiment of the invention, the microemulsion is injected as divided into two portions in terms of its compositional makeup. The initial portion will contain co-surfactant, oil, and optionally, monovalent salt, alkaline agent, and alkyl aryl sulfonate within the designated concentration ranges. The terminal portion of the microemulsion may contain these same constituents but in lower concentrations, at least with respect to the amount of oil and the amount of co-surfactant. For example, the amount of oil and co-surfactant in the microemulsion may be progressively decreased either linearly or nonlinearly by increments down to zero such that the injected medium them comprises 100 percent of aqueous solution. The petroleum sulfonate, if present, may also be injected in progressively lower concentrations. Normally the concentrations of sodium chloride and alkaline agent, if present, will not change.

The present invention may be carried out utilizing injection and production systems as defined by any suitable arrangements of wells. One well arrangement commonly used in waterflooding operations and suitable for use in carrying out the present invention is an integrated five-spot pattern of the type illustrated in the drawing. In the drawing, the legend ○ is used to indicate a production well and the legend ● is used to indicate an injection well. The integrated pattern comprises a plurality of five-spot patterns, each of which comprises a central production well as indicated by reference character 2 and four peripheral injection wells as indicated by reference numerals 3, 4, 5, and 6. The term "pore volume", as used herein and in the appended claims to define the quantities of fluid injected in carrying out the invention, designates the pore volume of the formation underlying the well pattern defined by the wells comprising the injection and production systems. Thus the term pore volume as used with reference to the pattern shown in the drawing is the pore volume of that portion of the formation underlying the area enclosed by broken line 8.

Of course, other well arrangements may be used in carrying out the present invention such as the direct or staggered line drive patterns, the four-spot, seven-spot, or nine-spot patterns, or circular flood patterns. For further description of these and other well arrangements which may be employed in waterflooding, reference is made to Calhoun, J. C., Jr., FUNDAMENTALS OF RESERVOIR ENGINEERING, Univ. of Oklahoma Press, Norman (1960), pp. 371–376, and Uren, L. C., PETROLEUM PRODUCTION ENGINEERING-OIL FIELD EXPLOITATION, McGraw-Hill Book Co., Inc., New York, Toronto, and London (1953), pp. 528–534. It is to be recognized also that the invention may be carried out utilizing dually completed injection-production wells of the type disclosed, for example, in U.S. Pat. No. 2,725,106 to Spearow. This arrangement may sometimes be utilized to advantage in relatively thick reservoirs in which it is desirable to displace the oil in the reservoir upwardly and recover the oil from the upper portion of the reservoir.

With respect to the quantities of displacing fluid employed in carrying out the present invention, the microemulsion preferably is injected in an amount within the range of 0.05–0.4 pore volume. If initial and terminal portions of the slug of different compositional makeup are injected as described previously, the intial portion of the slug normally will be injected in an amount within the range of 0.05–0.2 pore volume. The remainder or terminal portion of the microemulsion slug will then be injected in an amount of up to about 0.2 pore volume.

The microemulsion may, and in most cases will, be preceded by the injection of a protective slug and followed by the injection of a mobility control slug. The protective slug will be injected in an amount of up to one pore volume and functions to displace the formation brine ahead of the microemulsion and to provide a "buffer" between the formation brine and the microemulsion. Normally the protective slug should be fresh water or salt water exhibiting a monovalent salt salinity of no greater than 2.5 weight percent. This slug should be substantially free of divalent metal ions such as calcium and magnesium in order to avoid precipitation of neutralized organic acids in the microemulsion and also the alkyl aryl sulfonate if present. As a practical matter, water containing divalent ions in a concentration no greater than 50 ppm may be employed in forming the protective slug as well as the microemulsion slug. The protective slug may also contain sacrificial agents such as inorganic polyphosphates or alkali metal carbonates. These additives may also be present in the microemulsion.

The mobility control slug, if employed, may comprise an aqueous solution of a thickening agent to increase the viscosity of the slug to a value at least as great as the viscosity of the reservoir oil. Various thickening agents which may be employed to increase the viscosity or apparent viscosity of water are well known to those skilled in the art and include such naturally occurring materials as guar gum or Karaya gum, or such synthetic materials as the polysaccharide B-1459 available from the Kelco Chemical Company under the trade name "Kelzan", poly(glucosylglucan)s, such as disclosed in U.S. Pat. No. 3,372,749 to Williams, and available from the Pillsbury Company under the trade name "Polytran", or the partially hydrolyzed polyacrylamides available from the Dow Chemical Company under the trade name "Pusher Chemicals".

The relatively viscous mobility control slug normally is injected in an amount up to about 0.5 pore volume. The viscosity of the mobility control slug desirably is graded at its leading and trailing edges between the viscosity of water and a maximum viscosity which is at least as great as the viscosity of the reservoir oil, and in any case than the viscosity of the preceding microemulsion. This is accomplished by progressively increasing the concentration of the polymeric thickening agent to its maximum value, normally within the range of 250 to 2500 parts per million in the case of Kelzan, at its leading edge and then decreasing the concentration to zero at its trailing edge. The thickening agent concentration may be increased and decreased linearly or nonlinearly by increments.

Subsequent to the injection of the mobility control slug, a driving fluid is injected in order to displace the previously injected fluids through the formation. The driving fluid typically may be any water which is locally available and is not incompatible with the formation. The driving fluid is injected in such amount as is necessary to carry the displacement process to completion.

I claim:

1. In the recovery of oil from a subterranean oil reservoir penetrated by spaced injection and production systems, the method comprising:
    a. contacting a petroleum oil with an aqueous solution of an alkaline agent to extract neutralized organic acids from said oil in said aqueous medium,
    b. separating from a portion of said oil, a mixture of oil and the resulting aqueous solution of neutralized organic acids, said mixture containing oil in an amount within the range of 0.5–50 percent by volume,
    c. adding to said mixture a co-surfactant having mutual solubility for oil and water in an amount sufficient to form a water external a microemulsion,
    d. injecting said microemulsion into said reservoir via said injection system,
    e. thereafter injecting into said reservoir via said injection system an aqueous flooding medium to displace oil to said production system and,
    f. recovering oil from said production system.

2. The method of claim 1 wherein said mixture contains oil in an amount within the range of 2–20 percent by volume.

3. The method of claim 1 wherein said co-surfactant is an alcohol having a molecular weight within the range of 40–300.

4. The method of claim 1 further comprising the step of, prior to step (c), adding a monovalent salt to said aqueous solution of neutralized organic acids.

5. The method of claim 4 further comprising the step of, prior to the addition of said co-surfactant, adding an alkaline agent to said aqueous solution of neutralized organic acids.

6. The method of claim 5 further comprising the step of, prior to the addition of said co-surfactant adding to said aqueous solution of neutralized organic acids an alkyl aryl sulfonate having a molecular weight within the range of 200–600.

7. In the recovery of oil from a subterranean oil reservoir penetrated by spaced injection and production systems, the method comprising:
    a. injecting into said reservoir via said injection system a water-external microemulsion comprised of an aqueous medium containing neutralized organic acids extracted from a petroleum oil, oil in an amount within the range of 0.5–50 percent by volume, and a co-surfactant having mutual solubility for oil and water,
    b. thereafter introducing into said reservoir via said injection system an aqueous flooding medium to displace oil to said production system, and
    c. recovering oil from said production system.

8. The method of claim 7 wherein said microemulsion contains oil in an amount within the range of 2–20 percent by volume.

9. The method of claim 7 wherein said microemulsion is injected in an amount within the range of 0.05–0.4 pore volume, and comprises an initial portion and a terminal portion, said terminal portion having a lower concentration of oil and of co-surfactant than said initial portion.

10. The method of claim 9 wherein said initial portion of microemulsion contains a petroleum sulfonate in an amount no greater than 10 weight percent based upon the aqueous medium in said microemulsion and said terminal portion of said microemulsion contains a petroleum sulfonate in a concentration lower than that in said initial portion.

11. The method of claim 9 wherein at least a portion of said aqueous flooding medium injected subsequent to the terminal portion of said microemulsion contains a thickening agent in an amount sufficient to increase the viscosity of said aqueous medium to a value greater than the viscosity of the preceeding microemulsion.

12. The method of claim 7 wherein said co-surfactant is an alcohol having a molecular weight within the range of 40–300 and is present in an amount within the range of 0.5–10 volume percent.

13. The method of claim 7 wherein said microemulsion contains a monovalent salt within the range of 0.5–2.5 weight percent based upon the aqueous medium in said microemulsion.

14. The method of claim 13 wherein said microemulsion exhibits a pH within the range of 10–12.

15. The method of claim 14 wherein said microemulsion contains an alkyl aryl sulfonate exhibiting a molecular weight within the range of 200–600, said alkyl aryl sulfonate being in a concentration no greater than 10 weight percent based upon the aqueous medium in said microemulsion.

* * * * *